US009852641B2

(12) United States Patent
Sugaya

(10) Patent No.: US 9,852,641 B2
(45) Date of Patent: Dec. 26, 2017

(54) SYSTEM AND METHOD OF CONTROLLING UNINHABITED AIRBORNE VEHICLE

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 37 days.

(21) Appl. No.: 14/982,234

(22) Filed: Dec. 29, 2015

(65) Prior Publication Data
US 2017/0076613 A1  Mar. 16, 2017

(30) Foreign Application Priority Data
Sep. 15, 2015 (JP) .................... 2015-181726

(51) Int. Cl.
*G08G 5/00* (2006.01)
*B64C 39/02* (2006.01)

(52) U.S. Cl.
CPC ......... *G08G 5/0039* (2013.01); *B64C 39/024* (2013.01); *G08G 5/0069* (2013.01); *B64C 2201/141* (2013.01)

(58) Field of Classification Search
CPC .. G08G 5/0039; G08G 5/0069; B64C 39/024; B64C 2201/141
See application file for complete search history.

(56) References Cited

U.S. PATENT DOCUMENTS

| | | | | |
|---|---|---|---|---|
| 5,265,023 A * | 11/1993 | Sokkappa | ............... | G06Q 10/06 701/117 |
| 5,788,186 A * | 8/1998 | White | ....................... | B64C 1/22 244/1 TD |
| 6,133,867 A * | 10/2000 | Eberwine | .............. | G01S 5/0072 342/125 |

(Continued)

FOREIGN PATENT DOCUMENTS

| | | | | |
|---|---|---|---|---|
| EP | 2131619 A2 * | 12/2009 | ............. | H04L 47/26 |
| EP | 2271049 A2 * | 1/2011 | ............. | H04L 63/06 |

(Continued)

OTHER PUBLICATIONS

Di et al., "Distributed coordinated task allocation for heterogeneous UAVs based on capacities," Year: 2013, pp. 1927-1932.*

(Continued)

*Primary Examiner* — Tuan C To
(74) *Attorney, Agent, or Firm* — Lex IP Meister, PLLC

(57) ABSTRACT

The present invention is to provide a system of controlling an uninhabited airborne vehicle and method of controlling an uninhabited airborne vehicle, which are capable of storing a flight route through which an airborne vehicle has flown to reproduce a flight of the uninhibited airborne vehicle. The system of controlling an uninhabited airborne vehicle by controlling a flight route of an uninhabited airborne vehicle, includes: a memory unit that stores a flight route through which an uninhabited airborne vehicle has flown; an acquisition unit that acquires the flight route stored in the memory unit; and a control unit that controls the flight (Continued)

route acquired by the acquisition unit to reproduce a flight of the uninhibited airborne vehicle.

18 Claims, 2 Drawing Sheets

(56) References Cited

U.S. PATENT DOCUMENTS

| | | | | |
|---|---|---|---|---|
| 7,747,364 | B2* | 6/2010 | Roy | G05D 1/0044 244/158.1 |
| 8,515,609 | B2* | 8/2013 | McAndrew | G05D 1/0038 244/76 R |
| 9,317,036 | B2* | 4/2016 | Wang | G05D 1/0214 |
| 9,422,139 | B1* | 8/2016 | Bialkowski | B66D 1/48 |
| 2012/0065881 | A1* | 3/2012 | McIver | G01C 23/00 701/467 |
| 2012/0209457 | A1* | 8/2012 | Bushnell | G01C 21/00 701/13 |
| 2014/0032021 | A1* | 1/2014 | Metzler | G01S 5/0036 701/3 |
| 2014/0231590 | A1* | 8/2014 | Trowbridge | A63H 27/12 244/175 |
| 2015/0142211 | A1* | 5/2015 | Shehata | H04N 7/181 701/2 |
| 2016/0068267 | A1* | 3/2016 | Liu | B64C 39/024 701/11 |
| 2016/0209839 | A1* | 7/2016 | Hoareau | G05D 1/0027 |
| 2016/0217589 | A1* | 7/2016 | Sasaki | G06K 9/0063 |
| 2016/0246304 | A1* | 8/2016 | Canoy | G05D 1/0816 |
| 2016/0275801 | A1* | 9/2016 | Kopardekar | G08G 5/0043 |
| 2017/0032683 | A1* | 2/2017 | Meserole, Jr. | G08G 5/0043 |
| 2017/0046960 | A1* | 2/2017 | Bernhardt | G08G 5/0086 |
| 2017/0076612 | A1* | 3/2017 | Takahashi | B64D 47/08 |

FOREIGN PATENT DOCUMENTS

| | | | | |
|---|---|---|---|---|
| EP | 2395454 | A2 * | 12/2011 | G06K 9/00355 |
| EP | 2849455 | A1 * | 3/2015 | H04N 21/4788 |
| JP | 2015-054613 | | 3/2015 | |

OTHER PUBLICATIONS

Hao et al., "UAV route planning based on the genetic simulated annealing algorithm," Year: 2010, pp. 788-793.*

* cited by examiner

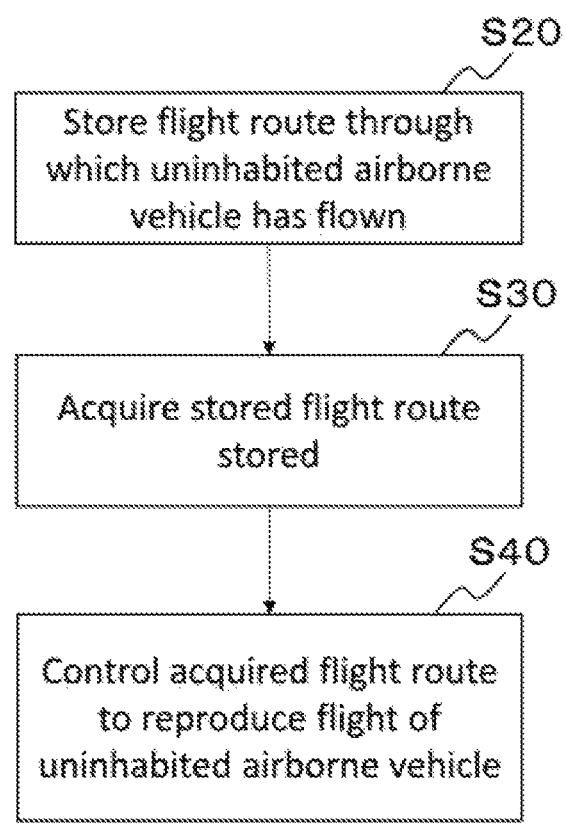

SYSTEM AND METHOD OF CONTROLLING UNINHABITED AIRBORNE VEHICLE

CROSS REFERENCE TO RELATED APPLICATIONS

This application claims priority to Japanese Patent Application No. 2015-181726 filed on Sep. 15, 2015, the entire contents of which are incorporated by reference herein.

TECHNICAL FIELD

The present invention relates to a system and a method of controlling an uninhabited airborne vehicle.

BACKGROUND ART

In an uninhabited airborne vehicle, a controller in the airframe generally controls the flight based on output signals from a sensor in the airframe and control signals from ground equipment. In some uninhabited airborne vehicles, no controllers are loaded in the airframe but more than one controller in ground equipment.

For example, the invention of Patent Document 1 provides a system of controlling an uninhabited airborne vehicle, which suitably achieves redundant control function with highly accurate controls even when a sufficient number of redundant controllers cannot be loaded in an uninhabited airborne vehicle.

CITATION LIST

Patent Literature

Patent Document 1: JP 2015-054613 A

SUMMARY OF INVENTION

However, there is a problem in which such a conventional system and method of controlling an uninhabited airborne vehicle cannot store a flight route through which an airborne vehicle has flown and therefore cannot reproduce a flight of the uninhibited airborne vehicle.

An objective of the present invention is to provide a system of controlling an uninhabited airborne vehicle and a method of controlling an uninhabited airborne vehicle which are capable of storing a flight route through which an airborne vehicle has flown to reproduce a flight of the uninhibited airborne vehicle.

According to the first aspect of the present invention, a system of controlling an uninhabited airborne vehicle by controlling a flight route of an uninhabited airborne vehicle includes:

a memory unit that stores a flight route through which an uninhabited airborne vehicle has flown;

an acquisition unit that acquires the flight route stored in the memory unit; and a control unit that controls the flight route acquired by the acquisition unit to reproduce a flight of the uninhibited airborne vehicle.

According to the second aspect of the present invention, a method of controlling an uninhabited airborne vehicle by controlling a flight route of an uninhabited airborne vehicle includes the steps of storing a flight route through which an uninhabited airborne vehicle has flown;

acquiring the stored flight route; and controlling the acquired flight route to reproduce a flight of the uninhibited airborne vehicle.

According to the present invention, the flight route through which an uninhabited airborne vehicle has flown is stored, and then the stored flight route is acquired and controlled to reproduce a flight of the uninhibited airborne vehicle.

BRIEF DESCRIPTION OF DRAWINGS

FIG. 2 is a flow chart illustrating the method of controlling an uninhabited airborne vehicle.

DESCRIPTION OF EMBODIMENTS

Figure 1:
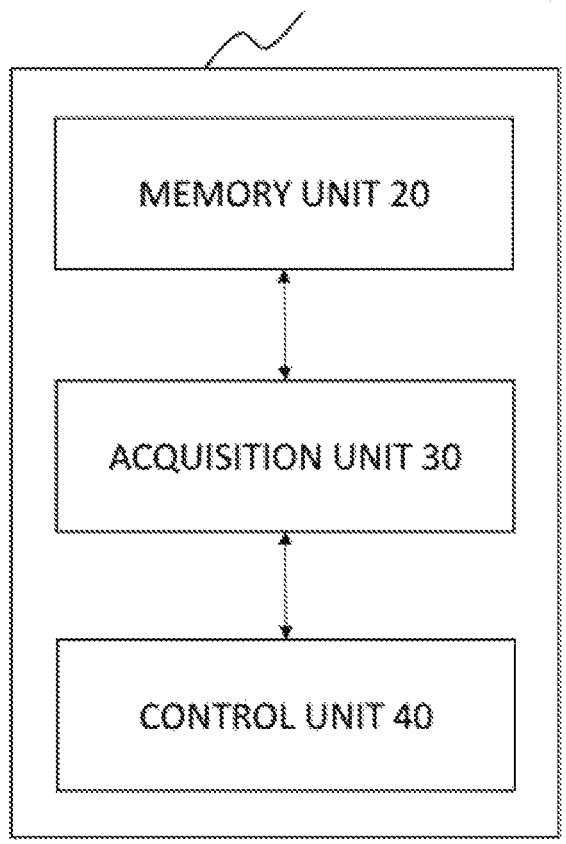
FIG. 1 is a block diagram illustrating the configuration of the system of controlling an uninhabited airborne vehicle.

Embodiments of the present invention will be described with reference to the attached drawings. However, this is illustrative only, and the technological scope of the present invention is not limited thereto.

System Configuration

FIG. 1 is a block diagram illustrating the configuration of the system of controlling an uninhabited airborne vehicle in an embodiment.

The system of controlling an uninhabited airborne vehicle 100 includes a memory unit 20 that stores a flight route through which an uninhabited airborne vehicle has flown, an acquisition unit 30 that acquires the flight route stored in the memory unit 20; and a control unit 40 that controls the flight route acquired by the acquisition unit 30 to reproduce a flight of the uninhibited airborne vehicle.

The memory unit 20 includes a maneuvered-procedure memory unit, a global positioning system (hereinafter referred to as "GPS"), an imaging unit, and various sensors such as an altimeter and a speed meter. The flight route through which an uninhabited airborne vehicle has flown is stored in a hard disk, etc., by storing a flight-maneuvered procedure and analyzing GPS information, an image, and then sensor information.

For example, a flight time is associated with information on latitude and longitude acquired from GPS, information on altitude acquired from the altimeter, and then sequentially stored in the memory unit 20 as flight route data. The flight time may be associated and stored with a flight-maneuvered procedure. The flight time may also be associated and stored with information on image analysis and various sensors.

The memory unit 20 may include a multiple-route memory unit that stores a plurality of flight routes through which an uninhabited airborne vehicle has flown.

The acquisition unit 30 acquires the flight route stored in the memory unit 20.

The acquisition unit 30 may include a route selection unit that selects and acquires a desired flight route from the memory unit 20 when the memory unit 20 includes a multiple-route memory unit. This can select a desired flight route from the plurality of flight routes through which an uninhabited airborne vehicle has flown to reproduce a flight of the uninhibited airborne vehicle, in particular.

The control unit 40 includes CPU and memory and controls the flight route acquired by the acquisition unit 30 to reproduce a flight of the uninhibited airborne vehicle.

The control unit 40 may include a detection unit that detects a shift distance between the uninhabited airborne vehicle and the acquired flight route while a flight of the uninhibited airborne vehicle is reproduced and a first correction unit that corrects a flight of the uninhabited airborne vehicle by returning the uninhabited airborne vehicle to the acquired flight route based on the shift distance detected by the detection unit. This can improve the accuracy of flight reproduction in response to a change in an external environment such as a weather condition and a change in a mechanical environment, such as a machine trouble while a flight of the uninhibited airborne vehicle is reproduced, in particular.

The control unit may include a stop unit that stops reproduction flight if the distance detected by the detection unit exceeds a threshold. This can reduce the risk for the damage, etc., of an uninhabited airborne vehicle in particular.

The control unit 40 may include an external information acquisition unit that acquires information on outside connected with the system through a network and a second correction unit that corrects a flight of the uninhabited airborne vehicle by returning the uninhabited airborne vehicle to the acquired flight route based on the information acquired by the external information acquisition unit. This can previously improve the accuracy of flight reproduction in response to a prediction of the change in the external environment such as a weather condition, in particular.

The control unit 40 may include a start point positioning unit that maneuvers an uninhabited airborne vehicle to automatically fly to the starting point of the acquired flight route before flight reproduction. This does not have to make someone carry an uninhabited airborne vehicle to the starting point of reproduction flight, in particular.

Processes

FIG. 2 is a flow chart illustrating the method of controlling an uninhabited airborne vehicle in an embodiment.

The method of controlling an uninhabited airborne vehicle includes the steps of:

storing a flight route through which an uninhabited airborne vehicle has flown (step S20);

acquiring the stored flight route (step S30); and controlling the acquired flight route to reproduce a flight of the uninhabited airborne vehicle (step S40).

The step S20 stores a flight route through which an uninhabited airborne vehicle has flown in a hard disk, etc., by storing a flight-maneuvered procedure and analyzing GPS, information, an image, and then sensor information.

For example, the step S20 associates and stores a flight time with information on latitude and longitude acquired from GPS, information on altitude acquired from the altimeter in a hard disk, etc., as flight route data. The flight time may be associated and stored with a flight-maneuvered procedure. The flight time may also be associated and stored with information on image analysis and various sensors.

The step S20 may store a plurality of flight routes through which an uninhabited airborne vehicle has flown.

The step S30 acquires the flight route stored by the step S20.

If the step S20 stores a plurality of flight routes, the step S30 may select and acquire a desired flight route from the plurality of flight routes stored by the step S20. This can select a desired flight route from the plurality of flight routes through which an uninhabited airborne vehicle has flown to reproduce a flight of the uninhibited airborne vehicle, in particular.

The step S40 controls the flight route acquired by the step S30 with CPU and memory to reproduce a flight of the uninhibited airborne vehicle.

The step S40 includes the steps of detecting a shift distance between the uninhabited airborne vehicle and the acquired flight route while a flight of the uninhibited airborne vehicle is reproduced; and correcting a flight of the uninhabited airborne vehicle by returning the uninhabited airborne vehicle to the acquired flight route based on the detected shift distance. This can improve the accuracy of flight reproduction in response to a change in an external environment such as a weather condition and a change in a mechanical environment, such as a machine trouble while a flight of the uninhibited airborne vehicle is reproduced, in particular.

The step S40 may include the step of stopping reproduction flight if the detected distance exceeds a threshold. This can reduce the risk for the damage, etc., of an uninhabited airborne vehicle in particular.

The step S40 may include the steps of acquiring information on outside connected with the system through a network; and correcting a flight of the uninhabited airborne vehicle by returning the uninhabited airborne vehicle to the acquired flight route based on the acquired information on the outside. This can previously improve the accuracy of flight reproduction in response to a prediction of the change in the external environment such as a weather condition in particular.

The step S40 may include the step of maneuvering an uninhabited airborne vehicle to automatically fly to the starting point of the acquired flight route before flight reproduction. This does not have to make someone carry an uninhabited airborne vehicle to the starting point of reproduction flight, in particular.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

100 System of controlling uninhabited airborne vehicle
20 Memory unit
30 Acquisition unit
40 Control unit
S20 Storing step
S30 Acquiring step
S40 Controlling step

What is claimed is:

1. A system of controlling an uninhabited airborne vehicle by controlling a flight route of an uninhabited airborne vehicle, comprising:

a memory unit that stores a flight route through which an uninhabited airborne vehicle has flown;

an acquisition unit that acquires the flight route stored in the memory unit; and a control unit that controls the flight route acquired by the acquisition unit to reproduce a flight of the uninhabited airborne vehicle, wherein the control unit detects a shift distance between the uninhabited airborne vehicle and the acquired flight route while a flight of the uninhabited airborne vehicle is reproduced, and corrects a flight of the uninhabited airborne vehicle by returning the uninhabited airborne vehicle to the acquired flight route based on the detected shift distance.

2. The system according to claim 1, wherein the memory unit stores a plurality of flight routes through which an uninhabited airborne vehicle has flown, and the acquisition unit selects and acquires a desired flight route from the plurality of flight routes.

3. The system according to claim 1, wherein the memory unit stores a flight-maneuvered procedure.

4. The system according to claim 1, wherein the memory unit stores a flight route through which an uninhabited airborne vehicle has flown from information provided from GPS.

5. The system according to claim 1, wherein the memory unit stores a flight route through which an uninhabited airborne vehicle has flown from an image taken by the uninhabited airborne vehicle.

6. The system according to claim 1, wherein the memory unit stores a flight route through which an uninhabited airborne vehicle has flown from information provided from a sensor.

7. The system according to claim 1, wherein the control stops reproduction flight if the detected shift distance exceeds a threshold.

8. The system according to claim 1, wherein the control unit
acquires information on outside connected with the system through a network; and
corrects a flight of the uninhabited airborne vehicle by returning the uninhabited airborne vehicle to the acquired flight route based on the acquired information.

9. The system according to claim 1, wherein the control unit maneuvers an uninhabited airborne vehicle to automatically fly to the starting point of the acquired flight route before flight reproduction.

10. A method of controlling an uninhabited airborne vehicle by controlling a flight route of an uninhabited airborne vehicle, comprising the steps of:
storing a flight route through which an uninhabited airborne vehicle has flown;
acquiring the stored flight route; and
controlling the acquired flight route to reproduce a flight of the uninhabited airborne vehicle,
wherein the step of controlling the flight route includes the steps of:
detecting a shift distance between the uninhabited airborne vehicle and the acquired flight route while a flight of the uninhabited airborne vehicle is reproduced; and
correcting a flight of the uninhabited airborne vehicle by returning the uninhabited airborne vehicle to the acquired flight route based on the shift distance detected by the step of detecting a shift distance.

11. The method according to claim 10, wherein
the step of storing a flight route includes the step of storing a plurality of flight routes through which an uninhabited airborne vehicle has flown; and
the step of acquiring the flight route includes the step of selecting and acquiring a desired flight route from the plurality of flight routes stored in the step of storing a plurality of flight routes.

12. The method according to claim 10, wherein the step of storing a flight route includes the step of storing a flight-maneuvered procedure.

13. The method according to claim 10, wherein the step of storing a flight route includes the step of analyzing and storing a flight route through which an uninhabited airborne vehicle has flown from information on GPS.

14. The method according to claim 10, wherein the step of storing a flight route includes the step of analyzing and storing a flight route through which an uninhabited airborne vehicle has flown from information on an image taken by the uninhabited airborne vehicle.

15. The method according to claim 10, wherein the step of storing a flight route includes the step of storing a flight route through which an uninhabited airborne vehicle has flown from information on a sensor.

16. The method according to claim 10, wherein the step of controlling the flight route includes the step of stopping reproduction flight if the distance detected by the detection unit exceeds a threshold.

17. The method according to claim 10, wherein the step of controlling the flight route includes the step of acquiring information on outside connected with the system through a network and correcting a flight of the uninhabited airborne vehicle by returning the uninhabited airborne vehicle to the acquired flight route based on the acquired information on the outside.

18. The method according to claim 10, wherein the step of controlling the flight route includes the step of maneuvering an uninhabited airborne vehicle to automatically fly to the starting point of the acquired flight route before flight reproduction.

* * * * *